US009026313B2

(12) United States Patent
Eggeling et al.

(10) Patent No.: US 9,026,313 B2
(45) Date of Patent: May 5, 2015

(54) DRIVE ARRANGEMENT FOR THE MOTORIZED ADJUSTMENT OF A FLAP ARRANGEMENT

(75) Inventors: Juergen Eggeling, Muelheim an der Ruhr (DE); Klaus Duenne, Ratingen (DE); Dirk Hellmich, Duisburg (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 181 days.

(21) Appl. No.: 13/816,443

(22) PCT Filed: Jul. 29, 2011

(86) PCT No.: PCT/EP2011/003816
§ 371 (c)(1),
(2), (4) Date: Jul. 18, 2013

(87) PCT Pub. No.: WO2012/019718
PCT Pub. Date: Feb. 16, 2012

(65) Prior Publication Data
US 2014/0025262 A1 Jan. 23, 2014

(30) Foreign Application Priority Data
Aug. 12, 2010 (DE) .......................... 10 2010 034 203

(51) Int. Cl.
*E05F 9/00* (2006.01)
*B60R 21/013* (2006.01)
(Continued)

(52) U.S. Cl.
CPC ............... *B60R 21/013* (2013.01); *B60J 5/103* (2013.01); *E05F 5/12* (2013.01); *E05Y 2900/546* (2013.01)

(58) Field of Classification Search
USPC ........... 701/49; 49/333, 334, 338; 318/1, 3, 6, 318/9; 296/155, 146.12; 340/436, 425.5, 340/545.1, 545.3; 292/201, 216
See application file for complete search history.

(56) References Cited

U.S. PATENT DOCUMENTS

2011/0215916 A1* 9/2011 Boehme et al. ................ 340/436
2012/0123649 A1* 5/2012 Eggers et al. ................... 701/49

FOREIGN PATENT DOCUMENTS

DE  19619126   11/1997
EP  1065083    1/2001
(Continued)

OTHER PUBLICATIONS

International Preliminary Report on Patentability for PCT/EP2011/003816 corresponding to U.S. Appl. No. 13/816,443 mailed Feb. 12, 2013 (13 pages) with translation.
(Continued)

*Primary Examiner* — Dalena Tran
(74) *Attorney, Agent, or Firm* — Pauly, DeVries Smith & Deffner, LLC

(57) ABSTRACT

The invention relates to a drive arrangement for the motorized adjustment of a flap arrangement for a motor vehicle, with a drive controller for producing a desired flap adjustment by means of at least one drive, wherein the flap arrangement is configured with two flap wings, wherein the two flap wings are each substantially pivotable about a respective spaced-apart, parallel pivot axis and, in the closed state, are in engagement with each other via a respective free wing end opposite the respective pivot axis. The two flap wings are assigned collision pivoting regions which are mounted upstream of the respective closed position and in which the movement regions of the flap wings overlap in such a manner that a predetermined opening and closing sequence has to be observed there in order to avoid collisions between the free wing ends.

15 Claims, 3 Drawing Sheets

(51) Int. Cl.
*B60J 5/10* (2006.01)
*E05F 5/12* (2006.01)

(56) References Cited

FOREIGN PATENT DOCUMENTS

| | | |
|---|---|---|
| EP | 1652708 | 5/2006 |
| JP | 9170374 | 6/1997 |
| WO | 02064929 | 8/2002 |
| WO | 2010046008 | 4/2010 |
| WO | 2012019718 | 2/2012 |

OTHER PUBLICATIONS

International Search Report and Written Opinion for PCT/EP2011/003816 corresponding to U.S. Appl. No. 13/816,443 mailed Feb. 2, 2012 (16 pages) with translation.

* cited by examiner

_US 9,026,313 B2_

DRIVE ARRANGEMENT FOR THE MOTORIZED ADJUSTMENT OF A FLAP ARRANGEMENT

CROSS-REFERENCE TO RELATED APPLICATIONS

This application is a national stage application under 35 U.S.C. 371 of International Patent application Ser. No. PCT/EP2011/003816, entitled "Antriebsanordnung zur motorischen Verstellung einer Kappenanordnung," filed Jul. 29, 2011, which claims priority from German Patent Application No. 10 2010 034 203.3, filed Aug. 12, 2010, the disclosures of which are incorporated herein by reference.

FIELD OF THE INVENTION

The present invention relates to a drive arrangement for the motorized adjustment of a flap arrangement and to a flap arrangement.

BACKGROUND OF THE INVENTION

Drive arrangements for the motorized adjustment of a flap arrangement for a motor vehicle, in particular of a tailgate arrangement, have long been known. Drive arrangements of this type have already been achieved for single-wing flap arrangements (WO 2010/046008 A1). In this case, the drive arrangement is generally equipped with a drive controller for realizing a respectively predefined desired flap adjustment by means of at least one drive. The requirement for the desired flap adjustment is based on an actuation by a user who, for example, presses the on button of a radio remote control.

With the requirement for increased flexibility of use, in recent years motor vehicles, in particular SUVs (Sport Utility Vehicles), have increasingly been equipped with two-wing flap systems (DE 196 19 126 A1). The flap concept to the fore here is based on two flap wings which are pivotable about two spaced-apart, parallel pivot axes. The basic possibility of separately adjusting the flap wings does indeed result in a considerable increase in the flexibility of use. However, said possibility also imposes very particular requirements on the drive arrangement if a motorized adjustment of the flap wings is required. This is because, generally, the movement regions of the flap wings will overlap in such a manner that a predetermined opening and closing sequence has to be observed at least in a certain movement region in order to avoid collisions.

The invention is based on the object of providing a drive arrangement with which the flexibility of a two-wing flap arrangement can be fully utilized.

The above problem is solved by a drive arrangement with a drive controller for producing a desired flap adjustment by means of at least one drive, wherein the flap arrangement is configured with two flap wings, wherein the two flap wings are each substantially pivotable about a spaced-apart, parallel pivot axis and, in a closed state, are in engagement with each other via a free wing end opposite the respective pivot axis, wherein the two flap wings are assigned collision pivoting regions which are mounted upstream of the respective closed position and in which a movement region of the flap wings overlap in such a manner that a predetermined opening and closing sequence has to be observed to avoid collisions between the free wing ends, and wherein the two collision pivoting regions are stored in the drive controller and wherein, when a desired flap adjustment runs counter to the predetermined opening and closing sequence in the collision pivoting regions of the flap wings, the drive controller temporarily pivots one of the flap wings out of an initial position in a deviating movement into a parking position located outside the collision pivoting region of the flap wing to avoid a collision.

The intellectual basis of the solution according to the invention first of all provides an analysis of the flap arrangement to be adjusted by motor.

It is first of all essential that the two flap wings of the flap arrangement are substantially pivotable about two spaced-apart pivot axes. "Substantially" here means that a circular pivoting movement is not necessarily required. The term "pivotable" also incorporates, for example, a combined pushing and pivoting movement.

In the closed state, the two flap wings are in engagement with each other via the free wing ends thereof opposite the respective pivot axis. This quite generally means that there is an interaction of some type between the free wing ends. However, a continuous force flux is not required in the closed state.

The arrangement has been made in such a manner that the movement regions of the flap wings overlap depending on the state of adjustment. The "movement region" always means the region which is passed over by a flap wing as a whole during the adjustment thereof However, the movement regions only overlap if the flap wings are in entirely specific pivoting regions mounted upstream of the respective closed position. In order to avoid collisions between the free wing ends, a predetermined opening and closing sequence between the two flap wings has to be observed in said pivoting regions. Accordingly, said pivoting regions are also called collision pivoting regions below. The collision pivoting regions also include the respective closed position of the flap wings.

According to the proposal, it has now been recognized that any measures for avoiding a collision have to be undertaken only when the two flap wings enter the respective collision pivoting region thereof. Accordingly, it is provided according to the proposal that the two collision pivoting regions are stored in the drive controller.

If the desired flap adjustment is intended to run counter to the predetermined opening and closing sequence in said collision pivoting regions, the drive controller initiates an entirely specific measure for avoiding a collision. According to the proposal, it is provided here that the drive controller temporarily pivots one of the flap wings out of the initial position thereof in a deviating movement into a parking position located outside the collision pivoting region of said flap wing in order to avoid a collision.

It therefore merely needs to be checked by the drive controller whether the two flap wings enter or are entered into the respective collision pivoting regions thereof simultaneously at any time and, if the answer is in the affirmative, whether the opening or closing sequence has then been infringed.

The measure according to the proposal for avoiding a collision is particularly easy to realize if it does not matter where exactly the parking position is located. All that is essential is for said parking position to be located outside the collision pivoting region of the respective flap wing.

In this connection, it must be pointed out that the deviating movement of the one flap wing can basically also be undertaken substantially simultaneously to the movement or the movements of the other flap wing.

In one embodiment, the desired flap adjustment is based on an actuation by the user, in particular via a radio remote control or the like. In another embodiment, the drive controller resets the flap wing carrying out the deviating movement, following the deviating movement, into the initial position thereof, or the drive controller adjusts the flap wing carrying out the deviating movement, following the deviating movement thereof, into the open position thereof. In another embodiment, the two flap wings are each assigned a free-wheeling pivoting region which adjoins the collision pivoting region and wherein an overlapping of the movement regions of the two flap wings is prevented, and wherein the drive controller does not initiate any deviating movement if at least one flap wing is located or comes to be located in the free-wheeling pivoting region thereof.

A preferred example of an above opening and closing sequence consists in that an inner flap wing and an outer flap wing are provided, wherein, during the closing, first of all the inner flap wing and then the outer flap wing is actuated and, during the opening, first of all the outer flap wing and then the inner flap wing is actuated. Of course, substantially simultaneous movements of the two flap wings are also covered here.

In one embodiment, as a starting point the two flap wings are located in the collision pivoting region thereof and only the inner flap wing is intended to be adjusted in the opening direction, the drive controller first adjusts the outer flap wing out of the initial position thereof into a parking position located outside the collision pivoting region thereof, and subsequently or substantially at the same time adjusts the inner flap wing in the opening direction and finally resets the outer flap wing into the initial position thereof. In another embodiment, as a starting point the inner flap wing is located outside the collision pivoting region thereof and the outer flap wing is located within the collision pivoting region thereof and the inner flap wing is intended to be adjusted in the closing direction, the drive controller first adjusts the outer flap wing out of the initial position thereof into a parking position located outside the collision pivoting region thereof, and subsequently or substantially at the same time adjusts the inner flap wing in the closing direction and resets the outer flap wing into the initial position thereof.

Here, a movement of the inner flap wing is in each case to the fore, wherein the outer flap wing "obstructs" the movement of the inner flap wing. Accordingly, a deviating movement of the outer flap wing is in each case provided in such a manner that said flap wing is temporarily adjusted into a parking position located outside the collision pivoting region thereof. As soon as the risk of a collision is eliminated, the outer flap wing is reset again into the initial position thereof. It is demonstrated particularly clearly here that the definition of the collision pivoting regions for the two flap wings leads to solutions which can be realised in a particularly simple manner in terms of control technology.

According to a further teaching which also has independent importance, a flap arrangement for a motor vehicle with a drive arrangement as above is claimed. Reference should be made to all of the embodiments which are suitable for describing the flap arrangement.

In one embodiment, the parking positions of the two flap wings are located outside the collision pivoting region, and are predetermined positions of the flap wings that are stored in the drive controller. In one embodiment, the drive controller is assigned means, in particular rotary sensors or the like, for determining the pivoting positions of the two flap wings.

In another embodiment, a flap arrangement for a motor vehicle with two flap wings is provided, in which the two flap wings are each substantially pivotable about a spaced-apart, parallel pivot axis and, in a closed position, are in engagement with each other via free wing ends opposite each respective pivot axis, wherein the two flap wings are assigned collision pivoting regions which are mounted upstream of the respective closed position and wherein a movement region of each flap wing overlaps in such a manner that a predetermined opening and closing sequence has to be observed to avoid a collision between the respective free wing ends, wherein a drive arrangement for the motorized adjustment of the flap arrangement is provided with a drive controller for producing a desired flap adjustment by means of at least one drive, wherein the two collision pivoting regions are stored in the drive controller and wherein, when a desired flap adjustment runs counter to the predetermined opening and closing sequence in the collision pivoting regions of the flap wings, the drive controller temporarily pivots one of the flap wings out of an initial position in a deviating movement into a parking position located outside the collision pivoting region of the flap wing to avoid a collision. In one embodiment, the respective pivot axes of the flap wings are oriented substantially horizontally, and, preferably, in that the inner flap wing corresponds to the lower flap wing and the upper flap wing corresponds to the outer flap wing. In one embodiment, the flap wings are assigned to a tailgate arrangement or to a side door arrangement of a motor vehicle.

BRIEF DESCRIPTION OF THE DRAWINGS

The invention is explained in more detail below with reference to a drawing which merely illustrates one exemplary embodiment. In the drawing

DETAILED DESCRIPTION

Figure 1:
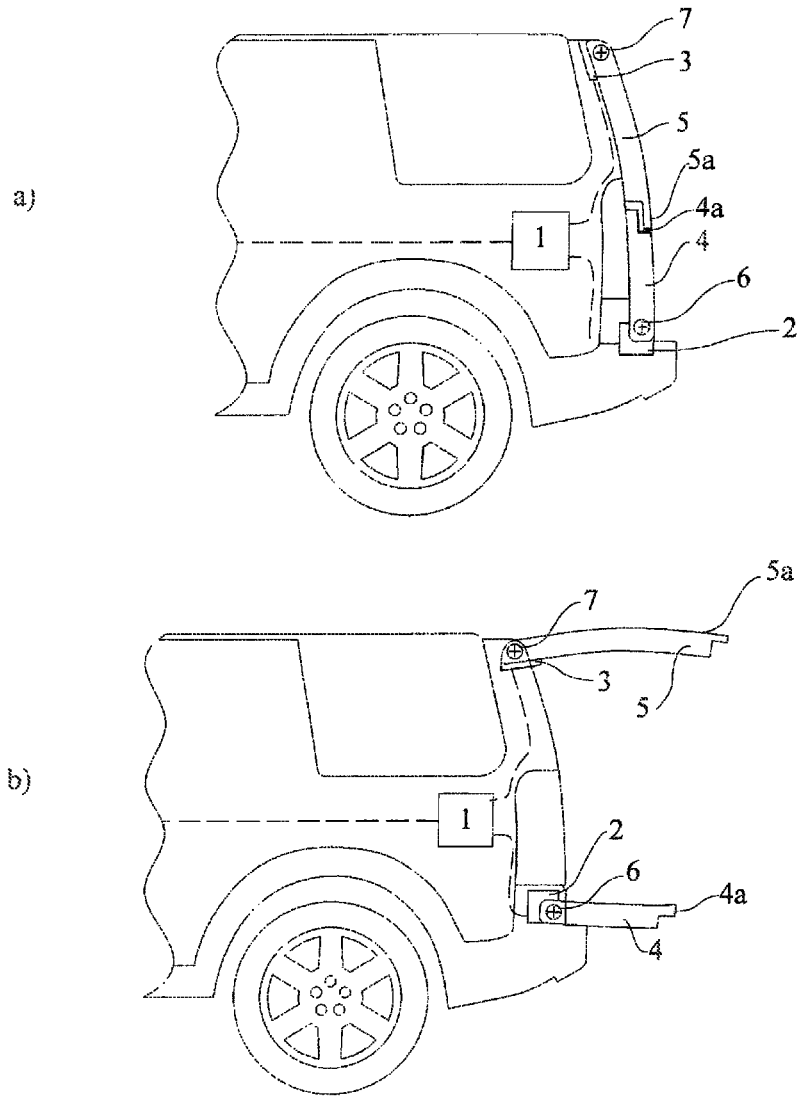
FIG. 1 shows the rear region of a motor vehicle with a drive arrangement according to the proposal $a$) when the flap arrangement is completely closed and $b$) when the flap arrangement is completely open.

It should be pointed out beforehand that when a flap arrangement is discussed below, said flap arrangement may be a tailgate arrangement, a side door arrangement or another closing device of a motor vehicle. In this respect, the term "flap arrangement" should be interpreted broadly. Only a tailgate arrangement is discussed below, but this should not be understood in a limiting sense.

The drive arrangement according to the proposal serves for the motorized adjustment of a two-wing flap arrangement for a motor vehicle. The drive arrangement is equipped with a drive controller 1 for activating two drives 2, 3. The drives 2, 3 are respectively assigned to flap wings 4, 5. In principle, it is also conceivable for the two flap wings 4, 5 to be provided via a single drive 2, 3 which is optionally connected via a coupling mechanism to the flap wings 4, 5.

The two flap wings 4, 5 are substantially pivotable about two spaced-apart, parallel pivot axes 6, 7 and, in the closed state illustrated in fig. 1a), are in engagement with each other via the free wing ends 4a, 5a thereof opposite the respective pivot axis 6, 7.

It should be pointed out that the term "flap wing" should be understood here in a broad sense. For example, the term also covers a pivotable window, in particular a pivotable rear window, which then takes on the basic function of a flap wing 4, 5.

A comparison of FIG. 1$a$) and 1$b$) reveals that, when the two drives 2, 3 are activated, care has to be taken to ensure a collision-free pivoting movement of the two flap wings 4, 5. The geometrical relationships can best be seen from the illustrations according to FIG. 2.

The two flap wings 4, 5 can be assigned collision pivoting regions 8, 9 which are mounted upstream of the respective closed position and in which the movement regions 10, 11 of the flap wings 4, 5 overlap in such a manner that a predetermined opening and closing sequence has to be observed there in order to avoid collisions between the free wing ends 4a, 5a. For example, it is revealed in the illustration according to FIG. 2 that the lower flap wing 4 can be adjusted in the opening direction only after the upper flap wing 5. Details regarding the opening and closing sequence provided here are provided further below.

It is then essential for the two collision pivoting regions 8, 9 to be stored in the drive controller 1. Depending on the respective desired flap adjustment in respect of the collision pivoting regions 8, 9, the drive controller 1 finds measures for avoiding a collision. In the event that a desired flap adjustment runs counter to the predetermined opening and closing sequence in the collision pivoting regions 8, 9 of the flap wings 4, 5, the drive controller 1 temporarily pivots one of the flap wings 4, 5 out of the initial position thereof in a deviating movement into a parking position located outside the collision pivoting region 8, 9 of said flap wing in order to avoid a collision. This would be the case, for example, if the lower flap wing 4 is intended to be adjusted from the position illustrated in FIG. 2 in the opening direction. In this case, the upper flap wing 5 would be pivoted temporarily into a parking position until the lower flap wing 4 has left the collision pivoting region 8 thereof In a particularly preferred configuration, the requirement for the desired flap adjustment is based on an actuation by the user, here via a radio remote control or the like. However, it is also conceivable for the desired flap adjustment to be predefined by a master motor vehicle controller.

The drive controller 1 preferably resets the flap wing 4, 5 carrying out the deviation movement, after the deviating movement, into the initial position thereof. However, it is also conceivable for the drive controller 1 to adjust the flap wing 4, 5 carrying out the deviating movement, after the deviating movement thereof into the open position thereof.

Figure 2:
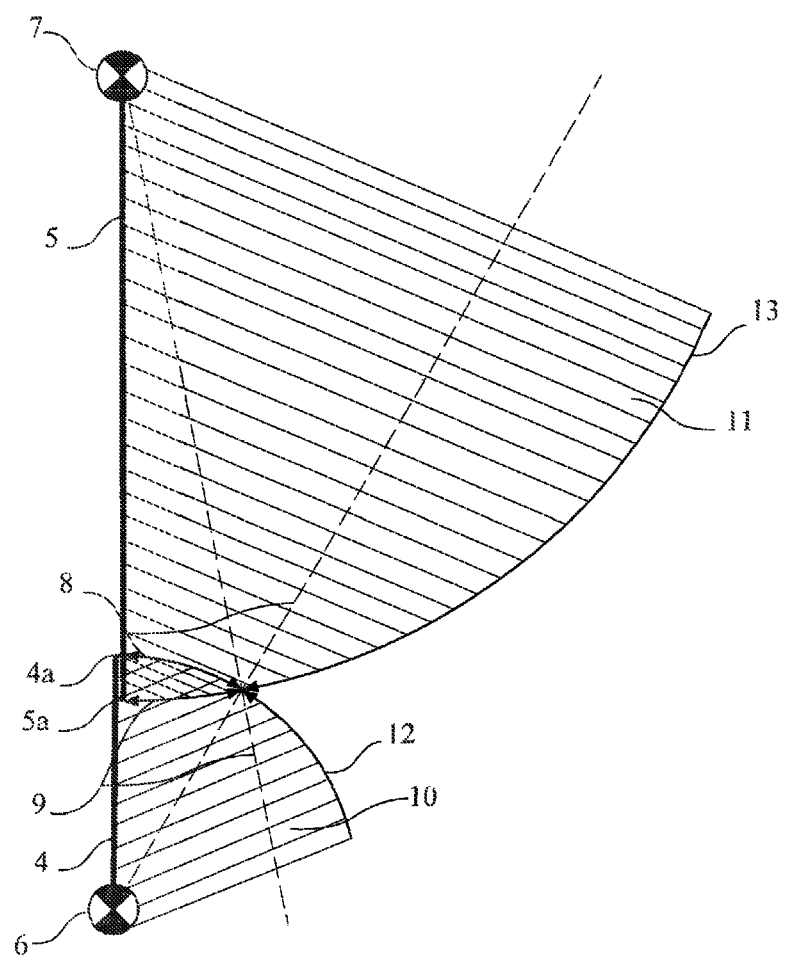
FIG. 2 shows the flap arrangement of the motor vehicle according to FIG. 1 in an entirely schematic illustration.

The illustration according to FIG. 2 shows that the two flap wings 4, 5 are each assigned a freewheeling pivoting region 12, 13 which adjoins the collision pivoting region 8, 9 and in which an overlapping of the movement regions of the two flap wings 4, 5 in the above sense is prevented. The freewheeling pivoting regions 12, 13 are also stored in the drive controller 1. Accordingly, the drive controller 1 does not initiate any deviating movement if at least one flap wing 4, 5 is always located or comes to be located in the freewheeling pivoting region 12, 13 thereof.

It has already been pointed out that a compulsory opening and closing sequence within the collision pivoting regions 8, 9 of the flap wings 4, 5 arises from the above overlapping of the movement regions 10, 11. In detail, during the closing, first of all an inner flap wing 4 and then an outer flap wing 5 is to be closed whereas, during the opening, first of all the outer flap wing 5 and then the inner flap wing 4 is to be opened. Otherwise, the one flap wing 4, 5 would be in the way of the other flap wing 5, 4.

Two desired flap adjustments which are of particular importance for the solution according to the proposal are discussed below.

Figure 3:
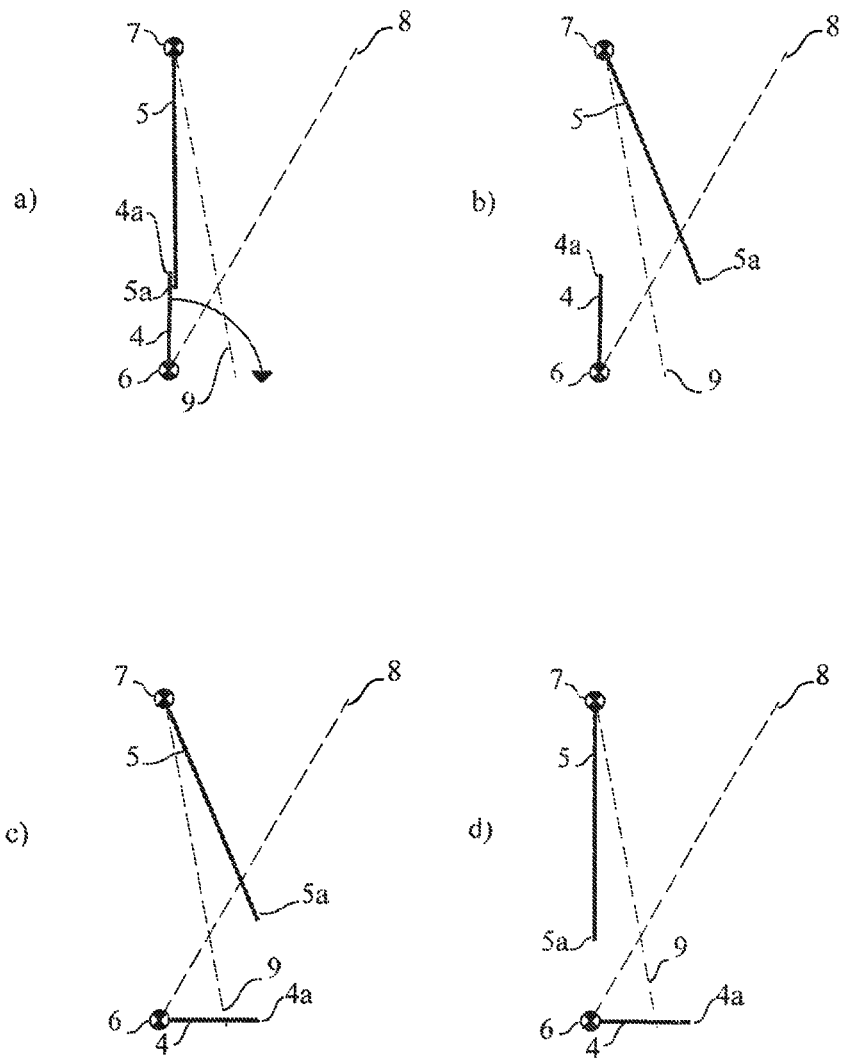
FIG. 3 shows the flap arrangement according to FIG. 2 $a$) in the completely closed state, $b$) during the deviating movement of the upper flap wing, $c$) during the carrying out of the desired flap adjustment, and $d$) during the resetting of the upper flap wing into the initial position.

In a preferred alternative of a desired flap adjustment, as a starting point the two flap wings 4, 5 are located in the collision pivoting region 8, 9 thereof, wherein only the inner flap wing 4 is intended to be adjusted in the opening direction. This state corresponds to the illustration according to FIG. 3a). In this case, the drive controller 1 first of all adjusts the outer flap wing 5 out of the initial position thereof, which is illustrated in FIG. 3a), into a parking position located outside the collision pivoting region 9 thereof and is illustrated in FIG. 3b). Subsequently or substantially at the same time, the drive controller 1 adjusts the inner flap wing 4 in the opening direction, as illustrated in FIG. 3c). Finally, the drive controller 1 resets the outer flap wing 5 into the initial position thereof. This is illustrated in FIG. 3b).

As a result, the user only predefines the desired flap adjustment, namely that the inner flap wing 4 is adjusted in the opening direction. The collision-free realization of said desired flap adjustment is then taken on, as explained above, by the drive controller 1.

A second preferred alternative for a desired flap adjustment is closely related to the last-mentioned desired flap adjustment. It is provided here as a starting point that the inner flap wing 4 is located outside the collision pivoting region 8 thereof and the outer flap wing 5 is located within the collision pivoting region 9 thereof, wherein the inner flap wing 4 is now intended to be adjusted in the closing direction. For this situation, the drive controller 1 first of all adjusts the outer flap wing 5 out of the initial position thereof into a parking position located outside the collision pivoting region 9 thereof. Subsequently or substantially at the same time, the drive controller 1 adjusts the inner flap wing 4 in the closing direction. Finally, the outer flap wing 5 is reset again into the initial position thereof. Said second alternative of the desired flap adjustment is therefore substantially a reversal of the first-mentioned desired flap adjustment.

In principle, provision may be made for the parking positions of the two flap wings 4, 5, which parking positions are located outside the respective collision pivoting region 8, 9, to be recalculated upon each movement. However, the parking positions of the two flap wings 4, 5 here, and preferably, are predetermined positions of the flap wings 4, 5 that are stored in the drive controller 1.

It goes without saying that the equipping of the drive controller 1 with means for determining the pivoting positions of the two flap wings 4, 5 is essential for realizing the solution according to the proposal. In particular, said means are rotary sensors or the like.

However, it is also conceivable for said means to involve a time measurement providing a conclusion regarding the pivoting position of the flap wings 4, 5. Other alternatives are conceivable.

According to a further teaching which likewise obtains independent importance, the above-explained flap arrangement is claimed for a motor vehicle. Reference should be made to all of the embodiments in this regard.

The two pivot axes 6, 7 of the flap wings 4, 5 are oriented here, and preferably, substantially horizontally. However, it is conceivable for the two pivot axes 6, 7 of the flap wings 4, 5 to be oriented substantially vertically or in another manner. This is the case, for example, with the flap arrangement as a side door arrangement.

For the case in which the two pivot axes 6, 7 of the flap wings 4, 5 are oriented substantially horizontally, the inner flap wing 4 preferably corresponds to the lower flap wing 4 and the upper flap wing 5 preferably corresponds to the outer flap wing 5. This may in principle also be provided the other way around.

It has already been pointed out that the flap wings 4, 5 may be assigned to a tailgate arrangement or to a side door arrangement of a motor vehicle. Other alternatives are also conceivable here.

The invention claimed is:

1. A drive arrangement for motorized adjustment of a flap arrangement for a motor vehicle, with a drive controller for producing a desired flap adjustment by means of at least one drive, wherein the flap arrangement is configured with two wings, wherein the two flap wings are each substantially pivotable about a respective spaced-apart, parallel pivot axis and, in a closed state, are in engagement with each other via a respective free wing end opposite the respective pivot axis, wherein the two flap wings are assigned collision pivoting regions which are mounted upstream of the respective closed position and in which a movement region of the flap wings overlap in such a manner that a predetermined opening and closing sequence has to be observed to avoid collisions between the free wing ends, and wherein the two collision pivoting regions are stored in the drive controller and wherein, when a desired flap adjustment runs counter to the predetermined opening and closing sequence in the collision pivoting regions of the flap wings, the drive controller temporarily pivots one of the flap wings out of an initial position in a deviating movement into a parking position located outside the collision pivoting region of the flap wing to avoid a collision.

2. The drive arrangement according to claim 1, wherein the desired flap adjustment is based on an actuation by the user.

3. The drive arrangement according to claim 2, wherein the actuation by the user is via a radio remote control.

4. The drive arrangement according to claim 1, wherein the drive controller resets the flap wing carrying out the deviating movement, following the deviating movement, into the initial position thereof, or wherein the drive controller adjusts the flap wing carrying out the deviating movement, following the deviating movement thereof, into the open position thereof.

5. The drive arrangement according to claim 1, wherein the two flap wings are each assigned a freewheeling pivoting region which adjoins the collision pivoting region and wherein an overlapping of the movement regions of the two flap wings is prevented, ands wherein the drive controller does not initiate any deviating movement if at least one flap wing is located or comes to be located in the freewheeling pivoting region thereof.

6. The drive arrangement according to claim 1, wherein, according to the predetermined opening and closing sequence, during the closing, first an inner flap wing and then an outer flap wing is closed, and wherein, during the opening, first the outer flap wing and then the inner flap wing is opened.

7. The drive arrangement according to claim 1, wherein, as a starting point the two flap wings are located in the collision pivoting region thereof and only the inner flap wing is intended to be adjusted in the opening direction, the drive controller first adjusts the outer flap wing out of the initial position thereof into a parking position located outside the collision pivoting region thereof, and subsequently or substantially at the same time adjusts the inner flap wing in the opening direction and finally resets the outer flap wing into the initial position thereof.

8. The drive arrangement according to claim 1, wherein, as a starting point the inner flap wing is located outside the collision pivoting region thereof and the outer flap wing is located within the collision pivoting region thereof and the inner flap wing is intended to be adjusted in the closing direction, the drive controller first adjusts the outer flap wing out of the initial position thereof into a parking position located outside the collision pivoting region thereof, and subsequently or substantially at the same time adjusts the inner flap wing in the closing direction and resets the outer flap wing into the initial position thereof.

9. The drive arrangement according to claim 1, wherein the parking positions of the two flap wings are located outside the collision pivoting region, and are predetermined positions of the flap wings that are stored in the drive controller.

10. The drive arrangement according to claim 1, wherein the drive controller is assigned means for determining the pivoting positions of the two flap wings.

11. The drive arrangement according to claim 10, wherein the means for determining the pivoting positions of the two flap wings comprises a rotary sensor.

12. A flap arrangement for a motor vehicle with two flap wings that are each substantially pivotable about a spaced-apart, parallel pivot axis and, in a closed position, are in engagement with each other via free wing ends opposite each respective pivot axis, wherein the two flap wings are assigned collision pivoting regions which are mounted upstream of the respective closed position and wherein a movement region of each flap wing overlaps in such a manner that a predetermined opening and closing sequence has to be observed to avoid a collision between the respective free wing ends, wherein a drive arrangement for the motorized adjustment of the flap arrangement is provided with a drive controller for producing a desired flap adjustment by means of at least one drive, wherein the two collision pivoting regions are stored in the drive controller and wherein, when a desired flap adjustment runs counter to the predetermined opening and closing sequence in the collision pivoting regions of the flap wings, the drive controller temporarily pivots one of the flap wings out of an initial position in a deviating movement into a parking position located outside the collision pivoting region of the flap wing to avoid a collision.

13. The flap arrangement according to claim 12, wherein the respective pivot axes of the flap wings are oriented substantially horizontally.

14. The flap arrangement according to claim 13, wherein an inner flap wing corresponds to a lower flap wing and a upper flap wing corresponds to an outer flap wing.

15. The flap arrangement according to claim 12, wherein the flap wings are assigned to a tailgate arrangement or to a side door arrangement of a motor vehicle.

* * * * *

UNITED STATES PATENT AND TRADEMARK OFFICE
CERTIFICATE OF CORRECTION

| | |
|---|---|
| PATENT NO. | : 9,026,313 B2 |
| APPLICATION NO. | : 13/816443 |
| DATED | : May 5, 2015 |
| INVENTOR(S) | : Juergen Eggeling, Klaus Duenne and Dirk Hellmich |

Page 1 of 1

It is certified that error appears in the above-identified patent and that said Letters Patent is hereby corrected as shown below:

Claims

Claim 1, Column 7, Line 10, "two wings" should read --two flap wings--.

Claim 5, Column 7, Line 45, "ands" should read --and--.

Signed and Sealed this
Ninth Day of February, 2016

Michelle K. Lee
*Director of the United States Patent and Trademark Office*